(12) United States Patent
Liao

(10) Patent No.: US 11,888,807 B2
(45) Date of Patent: Jan. 30, 2024

(54) MAIL INFORMATION DISPLAY METHOD AND APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD.

(*) Notice: Subject to any disclaimer, the term of this patent is extended or adjusted under 35 U.S.C. 154(b) by 0 days.

(21) Appl. No.: 17/936,611

(22) Filed: Sep. 29, 2022

(65) Prior Publication Data

US 2023/0014265 A1     Jan. 19, 2023

Related U.S. Application Data

(63) Continuation of application No. PCT/CN2021/085173, filed on Apr. 2, 2021.

(30) Foreign Application Priority Data

Apr. 30, 2020 (CN) .......................... 202010366941.2

(51) Int. Cl.
*H04L 51/56* (2022.01)
*H04L 51/046* (2022.01)

(52) U.S. Cl.
CPC ............ *H04L 51/56* (2022.05); *H04L 51/046* (2013.01)

(58) Field of Classification Search
CPC ....... H04L 51/56; H04L 51/046; H04L 51/04; H04L 51/52; H04L 51/216; H04L 67/306; H04L 51/10; H04L 51/02; G06Q 10/107; G06F 3/0482
See application file for complete search history.

(56) References Cited

U.S. PATENT DOCUMENTS

| 7,756,936 B2* | 7/2010 | Rosenberg ........... G06Q 10/107 709/206 |
| 8,639,552 B1* | 1/2014 | Chen .................... G06Q 10/107 705/7.21 |
| 8,887,289 B1* | 11/2014 | Hullale ................. H04W 12/02 726/25 |

(Continued)

FOREIGN PATENT DOCUMENTS

| CN | 101079785 A | 11/2007 |
| CN | 101416207 A | 4/2009 |

(Continued)

OTHER PUBLICATIONS

Search Report dated Jun. 29, 2021 for PCT Application No. PCT/CN2021/085173 with English translation (12 pages).

*Primary Examiner* — Ninos Donabed

(57) ABSTRACT

A mail information display method and apparatus, an electronic device, and a storage medium are provided. The method includes: displaying mail sharing information corresponding to a currently shared target mail in a target instant messaging IM dialog window of an IM client; and in response to detecting a mail viewing operation triggered by a user for the mail sharing information, creating a mail display window, and displaying mail information of the target mail in the mail display window, wherein the mail display window and the target IM dialog window are displayed on a same screen.

14 Claims, 8 Drawing Sheets

(56) References Cited

U.S. PATENT DOCUMENTS

| | | | |
|---|---|---|---|
| 9,189,788 B1* | 11/2015 | Robinson | G06Q 20/40145 |
| 9,195,996 B1* | 11/2015 | Walsh | G06Q 30/0269 |
| 9,395,893 B1* | 7/2016 | Beausoleil | G06F 40/186 |
| 10,148,601 B1* | 12/2018 | Dodelin | H04L 67/306 |
| 2007/0185961 A1 | 8/2007 | Perlow et al. | |
| 2013/0262106 A1* | 10/2013 | Hurvitz | G10L 15/183 |
| | | | 704/E15.044 |
| 2013/0268677 A1* | 10/2013 | Marshall | H04L 67/303 |
| | | | 709/226 |
| 2013/0275600 A1* | 10/2013 | Marshall | H04L 43/06 |
| | | | 709/226 |
| 2013/0282714 A1* | 10/2013 | Lathrom | G06F 16/955 |
| | | | 707/E17.014 |
| 2014/0067401 A1* | 3/2014 | Sanjeeva | G10L 13/00 |
| | | | 707/769 |
| 2014/0317092 A1* | 10/2014 | Trudeau | G06F 16/248 |
| | | | 707/722 |
| 2014/0365912 A1* | 12/2014 | Shaw | G06F 3/0482 |
| | | | 715/748 |
| 2015/0046542 A1* | 2/2015 | Yamamoto | H04L 12/1822 |
| | | | 709/206 |
| 2015/0180809 A1* | 6/2015 | Doulton | G10L 15/26 |
| | | | 709/206 |
| 2015/0188858 A1* | 7/2015 | Nagata | H04L 51/066 |
| | | | 715/758 |
| 2015/0201078 A1* | 7/2015 | Khouri | H04M 3/5232 |
| | | | 379/265.12 |
| 2015/0242262 A1* | 8/2015 | Ranganathan | G06F 11/0787 |
| | | | 714/37 |
| 2015/0244600 A1* | 8/2015 | Ranganathan | H04L 41/5009 |
| | | | 709/204 |
| 2015/0319206 A1* | 11/2015 | Sanghavi | H04L 65/60 |
| | | | 709/204 |
| 2015/0355734 A1* | 12/2015 | Lo | G06F 3/0383 |
| | | | 345/179 |
| 2015/0356581 A1* | 12/2015 | Litmanovich | G06Q 30/0204 |
| | | | 705/7.33 |
| 2015/0358693 A1* | 12/2015 | Rodriguez | H04N 21/21815 |
| | | | 725/110 |
| 2016/0259496 A1* | 9/2016 | Butcher | G06F 3/04842 |
| 2016/0259517 A1* | 9/2016 | Butcher | G06F 3/04847 |
| 2016/0261545 A1* | 9/2016 | Bastide | H04L 51/52 |
| 2016/0269440 A1* | 9/2016 | Hartman | H04L 51/42 |
| 2016/0344867 A1* | 11/2016 | Krishnaswamy | H04M 15/882 |
| 2016/0352677 A1* | 12/2016 | Gordon | H04L 51/04 |
| 2017/0005957 A1* | 1/2017 | Han | H04L 51/04 |
| 2017/0315680 A1 | 11/2017 | Yip et al. | |
| 2017/0352041 A1* | 12/2017 | Ramamurthy | G06N 5/043 |
| 2018/0213043 A1* | 7/2018 | Ravishankar | H04L 67/06 |
| 2018/0288018 A1* | 10/2018 | Cooke | G06F 15/16 |
| 2018/0343214 A1* | 11/2018 | Shen | H04L 51/48 |
| 2019/0007362 A1* | 1/2019 | Shmunis | H04L 51/216 |

FOREIGN PATENT DOCUMENTS

| | | |
|---|---|---|
| CN | 103457833 A | 12/2013 |
| CN | 105897553 A | 8/2016 |
| CN | 108306810 A | 7/2018 |
| CN | 109918345 A | 6/2019 |

* cited by examiner

MAIL INFORMATION DISPLAY METHOD AND APPARATUS, ELECTRONIC DEVICE, AND STORAGE MEDIUM

This application is a continuation application of International Application No. PCT/CN2021/085173, filed on Apr. 2, 2021, which claims the priority to the Chinese Patent Application No. 202010366941.2, titled "MAIL INFORMATION DISPLAY METHOD AND APPARATUS, ELECTRONIC DEVICE, AND STORAGE MEDIUM", filed on Apr. 30, 2020 with the China National Intellectual Property Administration, both of which are incorporated herein by reference in entireties.

FIELD

The present disclosure relates to computer technology, and in particular, to a method and an apparatus for displaying mail information, an electronic device, and a storage medium.

BACKGROUND

With the rapid development of computer technology and an increasing demand of users, there is a need for a user to share a mail with other users, so that other users may view content of the mail.

SUMMARY

According to the embodiments of the present disclosure, a method and an apparatus for displaying mail information, an electronic device, and a storage medium are provided, to improve the information viewing efficiency and the user experience.

In a first aspect, a method for displaying mail information is provided according to an embodiment of the present disclosure, which includes:

displaying mail sharing information corresponding to a shared target mail in a target IM dialog window of an instant messaging IM client; and in response to detecting a mail viewing operation triggered by a user for the mail sharing information, creating a mail display window, and displaying mail information of the target mail in the mail display window, where the mail display window and the target IM dialog window are displayed on a same screen.

In a second aspect, an apparatus for displaying mail information is further provided according to an embodiment of the present disclosure, which includes a mail sharing information display module and a mail information display module.

The mail sharing information display module is configured to display mail sharing information corresponding to a shared target mail in a target IM dialog window of an instant messaging IM client.

The mail information display module is configured to: in response to detecting a mail viewing operation triggered by a user for the mail sharing information, create a mail display window, and display mail information of the target mail in the mail display window, where the mail display window and the target IM dialog window are displayed on a same screen.

In a third aspect, an electronic device is further provided according to an embodiment of the present disclosure, which includes one or more processors; and a memory configured to store one or more programs.

The one or more programs, when executed by the one or more processors, cause the one or more processors to implement the method for displaying the mail information according to any one of the embodiments of the present disclosure.

In a fourth aspect, a computer readable storage medium storing a computer program thereon is further provided according to an embodiment of the present disclosure. The program, when executed by a processor, causes the processor to implement the method for displaying the mail information according to any one of the embodiments of the present disclosure.

In the technical solution according to the embodiments of the present disclosure, in response to detecting a mail viewing operation triggered by a user for mail sharing information displayed in a target IM dialog window, a mail display window is created, and mail information of a target mail is displayed in the mail display window, so that the mail information and the target IM dialog window are displayed on a same screen. Therefore, the mail display window and the target IM dialog window may be on a same screen interface, so that the user may view the mail information and dialog information at the same time, which improves the information viewing efficiency and the user experience.

BRIEF DESCRIPTION OF THE DRAWINGS

In conjunction with the drawings and with reference to the following embodiments, the above and other features, advantages and aspects of the embodiments of the present disclosure are more apparent. Throughout the drawings, the same or similar reference numbers refer to the same or similar elements. It should be understood that the drawings are schematic and that the components and elements are not necessarily drawn to scale.

DETAILED DESCRIPTION OF EMBODIMENTS

Figure 1:
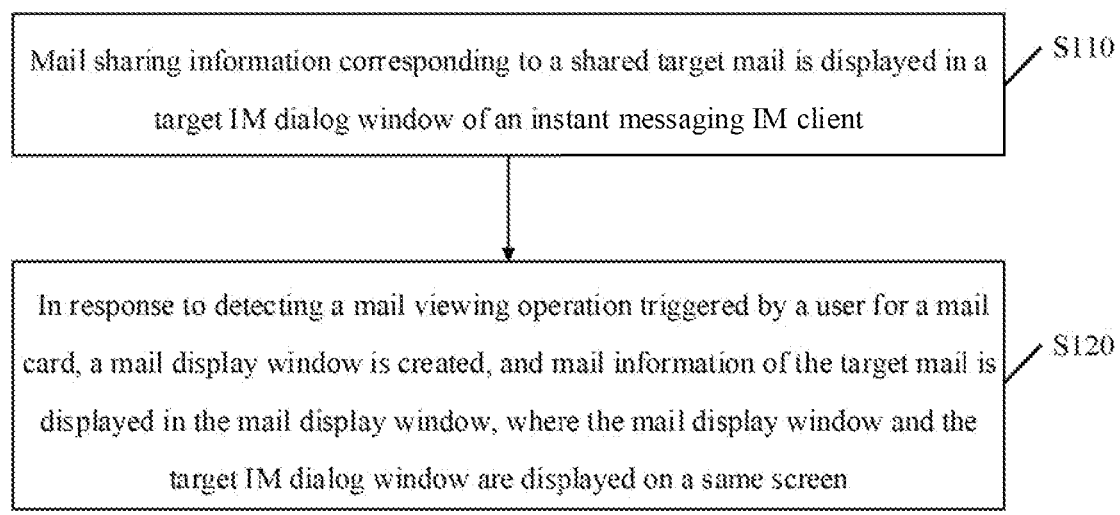
FIG. 1 is a schematic flowchart of a method for displaying mail information according to a first embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include additional steps and/or omit a step shown herein. The scope of the present disclosure is not limited in this aspect.

The term "include" and its variations in the present disclosure mean open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different devices, modules or units, and are not used to limit an sequential order or interdependence of the functions performed by the devices, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

In a process of implementing the present disclosure, it is found that when a user shares a mail to instant messaging (OM) clients of other users in order that other users can quickly view the shared mail, in an embodiment, a display interface of the shared mail overlays an IM dialog interface. Therefore, the user is required to manually close the display interface before viewing dialog information in the dialog interface, making the information viewing operation more complicated and reducing the information viewing efficiency and the user experience. In view of this, in some embodiments of the present disclosure, in response to detecting a mail viewing operation triggered by a user for mail sharing information displayed in a target IM dialog window, a mail display window is created, and mail information of a target mail is displayed in the mail display window, so that the mail information and the target IM dialog window are displayed on a same screen. Therefore, the mail display window and the target IM dialog window may be displayed on a same screen interface, so that the user may view the mail information and dialog information at the same time, without closing the dialog window before viewing the mail information, which simplifies the information viewing operation, thereby improving the information viewing efficiency and the user experience.

First Embodiment

FIG. 1 is a schematic flowchart of a method for displaying mail information according to a first embodiment of the present disclosure. This embodiment is applicable to a case where mail information of a shared mail is displayed in an IM client. The method may be performed by an apparatus for displaying mail information, and the apparatus may be implemented by means of software and/or hardware, and is integrated into the IM client. The IM client may refer to an IM client of a sharer who shares the mail, or may refer to an IM client of a sharee who receives the shared mail. The IM client may be integrated into a personal computer (PC) or a mobile terminal. As shown in FIG. 1, the method specifically includes the following steps S110 to S120.

In step S110, mail sharing information corresponding to a shared target mail is displayed in a target IM dialog window of an instant messaging IM client.

The IM dialog window may be a window for displaying dialog information input by each IM user in an IM dialog. The target mail may refer to a shared mail shared by the sharer at the current moment. There may be one or more target mails. The mail sharing information may be interactive dialog information, which may exist in various interactive forms, for example, it may be presented in a mail card. For example, the mail sharing information may be a display entry for displaying specific mail information of the target mail, so that the specific mail information of the target mail may be displayed by triggering the mail sharing information. The mail sharing information may be configured to prompt the user that there is currently a shared target mail. The target IM dialog window may be a dialog window for displaying mail sharing information corresponding to the target mail.

Specifically, the sharer may share the mail sharing information corresponding to the target mail to the IM client of the sharee corresponding to sharee IM information based on the sharee IM information. When receiving the mail sharing information, the IM client of the sharee may display the mail sharing information in the target IM dialog window.

Figure 2:
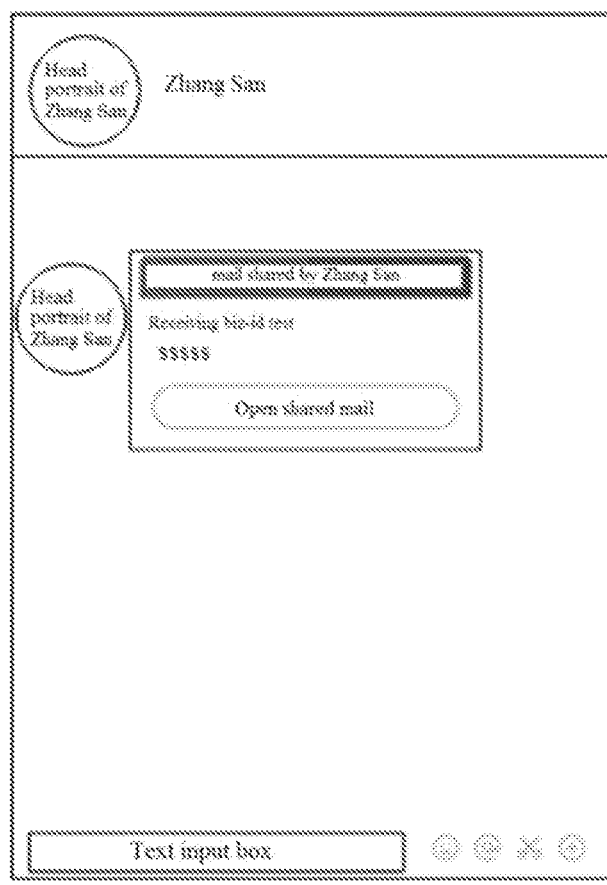
FIG. 2 is a display example of a target IM dialog window in an IM client of a sharee according to the first embodiment of the present disclosure.
Figure 3:
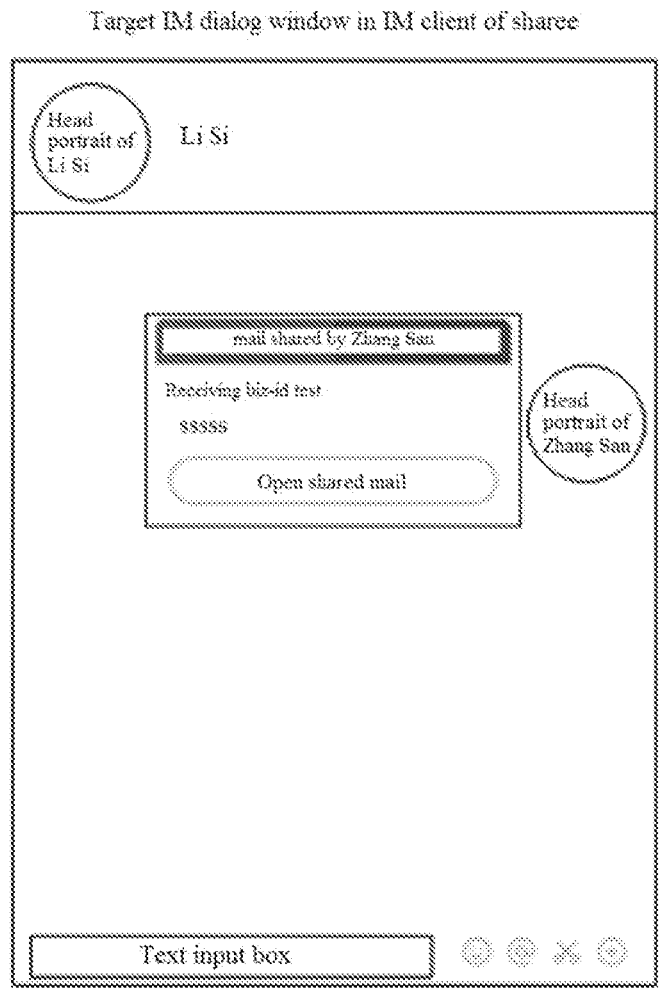
FIG. 3 is a display example of a target IM dialog window in an IM client of a sharer according to the first embodiment of the present disclosure.

Correspondingly, there is also a record of sharing the mail sharing information in the IM client of the sharer. That is, the mail sharing information corresponding to the currently shared target mail may also be displayed in the target IM dialog window in the IM client of the sharer. For example, FIG. 2 shows a display example of a target IM dialog window in an IM client of a sharee. FIG. 3 shows a display example of a target IM dialog window in an IM client of a sharer. As shown in FIG. 2, Zhang San (as the sharer) shares mail sharing information corresponding to a currently shared target mail to an IM client of Li Si (as the sharee). Therefore, the IM client of Li Si displays the mail sharing information in a target IM dialog window with Zhang San, to remind Li Si that the mail shared by Zhang San is currently received. Correspondingly, as shown in FIG. 3, an IM client of Zhang San also displays the mail sharing information in a target IM dialog window with Li Si to remind Zhang San that the mail is currently shared to Li Si.

It should be noted that, the technical solution in this embodiment may be applied to a sharer end, and may also be applied to a sharee end. That is, after the sharer shares the mail sharing information corresponding to the currently shared target mail, the mail sharing information corresponding to the currently shared target mail may be displayed in the target IM dialog window of the IM client of the sharer. The mail sharing information corresponding to the currently shared target mail may also be displayed in the target IM dialog window of the IM client of the sharee. The IM client of the sharer and the IM client of the sharee may display the mail information of the shared mail based on the mail sharing information in a same manner.

It should be noted that, the target mail shared by the sharer through a mail sharing operation may be controlled by the sharer. Specifically, an operation permission of the sharee on the target mail obtained due to the sharing by the sharer is a temporary permission, and the temporary permission of the sharee on the target mail is limited by an operation triggered by the sharer. For example, based on a sharing end operation triggered by the sharer, the mail sharing information corresponding to the target mail is no longer visible on the sharee end. Moreover, if the target mail is a mail received or sent in a mailbox of the sharer, the sharing operation performed by the sharer on the target mail will not modify mail content of the target mail. That is, no matter what kind of temporary permission the sharer grants to the sharee, target mail information presented by the sharee end is at least a part of the target mail determined based on the temporary permission. In addition, the sharer may set different mail processing permissions for different sharees. Compared with a mail forwarding operation, a mail forwarded through the mail forwarding operation is a mail that is actually received by a party to which the mail is forwarded and is not controlled by a forwarder, and the mail content of the mail to be forwarded in the mailbox is modifiable. Moreover, different parties to which the mail is forwarded have a same mail processing permission. Therefore, the mail sharing operation is different from the conventional mail forwarding operation.

In step S120, in response to detecting a mail viewing operation triggered by a user for the mail sharing information, a mail display window is created, and mail information of the target mail is displayed in the mail display window, where the mail display window and the target IM dialog window are displayed on a same screen.

The user may refer to a user corresponding to an IM client that currently displays the mail sharing information. If the current mail sharing information is displayed on the IM client of the sharer, the user refers to the sharer. If the current mail sharing information is displayed on the IM client of the sharee, the user refers to the sharee. The mail display window may refer to a display interface for displaying specific mail information of the shared mail. Simultaneously displaying on the same screen may refer to simultaneously displaying the mail display window and the IM dialog window on a same screen interface in the IM client, so that the user may view the mail information and dialog information at the same time.

Specifically, after the user views the mail sharing information in the target dialog window in the IM client, the mail viewing operation may be triggered by performing a click operation on the mail sharing information. The click operation may be, but not limited to, a touch-click or a mouse-click. For example, the user may trigger the mail viewing operation by clicking an "open shared mail" button on the mail sharing information in FIG. 2 or FIG. 3. When the IM client detects the mail viewing operation triggered by the user, the mail display window may be created to be displayed side by side with the target IM dialog window. Therefore, the technical effect of simultaneously displaying the mail display window and the target IM dialog window on the same screen interface can be achieved. In the created mail display window, the mail information of the target mail may be displayed with a preset display method corresponding to the mail sharing information, to realize the simultaneous display on the same screen. Therefore, the user may view the mail information and dialog information at the same time, without closing the IM dialog window before viewing the mail information, which greatly simplifies the information viewing operation, thereby improving the information viewing efficiency and the user experience.

In the technical solution according to the embodiments of the present disclosure, in response to detecting a mail viewing operation triggered by a user for mail sharing information displayed in a target IM dialog window, a mail display window is created, and mail information of a target mail is displayed in the mail display window, so that the mail information and the target IM dialog window are displayed on a same screen. Therefore, the mail display window and the target IM dialog window may be displayed on a same screen interface, so that the user may view the mail information and dialog information at the same time, without closing the dialog window before viewing the mail information, which simplifies the information viewing operation, thereby improving the information viewing efficiency and the user experience.

On the basis of the above technical solution, the process that a mail display window is created in step S120 may include: creating the mail display window that is displayed side by side with the target IM dialog window.

Figure 4:
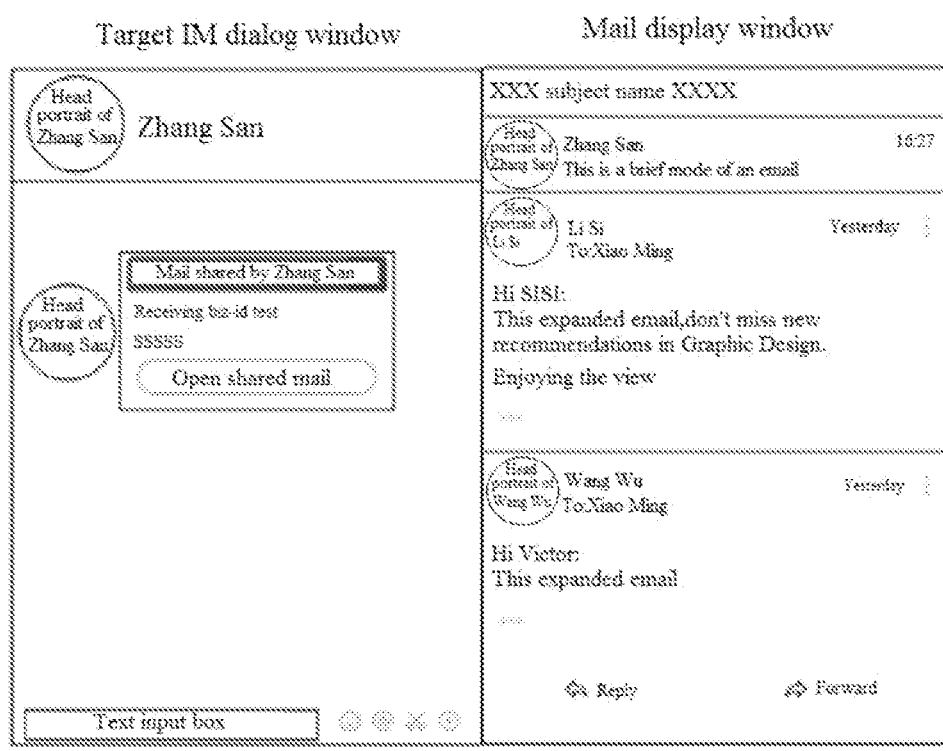
FIG. 4 is an example of a mail display window according to the first embodiment of the present disclosure.
Figure 5:
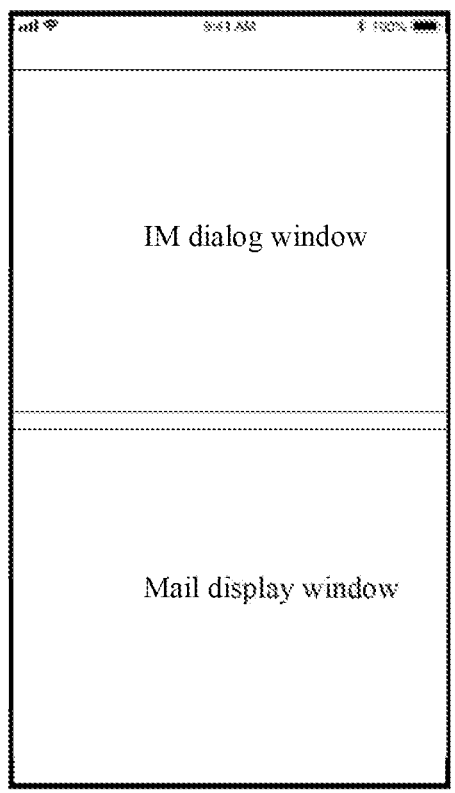
FIG. 5 is another example of a mail display window according to the first embodiment of the present disclosure.

Specifically, in response to detecting the mail viewing operation, the IM client may create the mail display window that is displayed independently from the target IM dialog window at a preset position of the target IM dialog window, such as a position on the right side, left side, upper side or lower side. Therefore, the target IM dialog window and the mail display window are displayed in parallel, so that the displayed mail information and dialog information are also displayed in parallel, and thus the user may more conveniently view the mail information and the dialog information at the same time, and the user experience is further improved. For example, FIG. 4 shows an example of a mail display window. An IM client in FIG. 4 is integrated in a PC. In response to detecting a mail viewing operation, a mail display window is automatically created on the right side of a target IM dialog window, so that the target IM dialog window and the mail display window may display information in parallel. FIG. 5 shows another example of a mail display window. An IM client in FIG. 5 is integrated in a mobile terminal. In response to detecting a mail viewing operation, due to a limited screen size, a target IM dialog window may be displayed in a reduced size, and a mail display window may be automatically created on the lower side of the reduced target IM dialog window. Therefore, the target IM dialog window and the mail display window may display information in parallel, so that the user may more conveniently view mail information and dialog information at the same time, and the user experience is further improved.

On the basis of the above technical solutions, a process that a mail display window is created in step S120 may include: creating a movable mail display window, in order that the mail display window is moved based on a window movement operation triggered by the user.

The mail display window may be an independent pop-up window, so that display positions and sizes of the target IM dialog window and the mail display window are not related to each other, and thus the mail display window may be moved based on the requirements of the user.

Specifically, in response to detecting the mail viewing operation, the IM client may create an independent pop-up window at a preset position of the target IM dialog window as the mail display window, so that the mail display window may be moved based on the window movement operation triggered by the user. For example, the user may select the mail display window by means of mouse or finger touch, to trigger the window movement operation. Once detecting the window movement operation, the IM client may monitor a movement position of the mouse or finger on a display interface in real time, and accordingly move the mail display window to a designated position based on the movement position. Therefore, the mail display window may be displayed at different positions on the display interface, which further satisfies the personalized needs of the user.

On the basis of the above technical solutions, a process that "mail information of the target mail is displayed in the mail display window" in step S120 may include: displaying brief information of all currently shared target mails in a list in the mail display window; and in response to detecting a detail viewing operation triggered for a cell where the brief information is located, displaying detailed information of a corresponding target mail.

The brief information of the target mail may include, but is not limited to, at least one of sender and receiver information, subject information, and text summary information of the target mail. The text summary information may refer to content of the first preset number of characters in a mail body. For example, content of a first line in the mail body is used as the body summary information.

Specifically, if the IM client detects the mail viewing operation, it may first display brief information of each target mail in the mail display window in the list. That is, each cell in the list is configured to display brief information of one target mail, as shown in FIG. 4. Therefore, when there are a large number of target mails, information of more target mails may be displayed in a limited display area, thereby improving the viewing experience of the user. If the user wants to view detailed information of a target mail in a displayed brief information list, the detail viewing operation may be triggered by clicking on the cell where the brief information of the target mail is located. Therefore, in response to detecting the triggering of the detail viewing operation, the IM client may extend the cell to display the detailed information of the target mail in the cell.

For example, if there is only one currently shared target mail, detailed information of the target mail may be directly displayed in the mail display window. If there are at least two target mails, brief information of each target mail may be displayed in the list in the mail display window, and in response to detecting the detail viewing operation triggered for the cell where the brief information is located, the detailed information of the corresponding target mail is displayed.

It should be noted that, if subject information of each currently shared target mail is the same, the subject information may be displayed in a combined manner. For example, the subject information is displayed at a top position of the mail display window, as shown in FIG. 4. Therefore, there is no need to display the subject information in each cell of the brief information list, which saves the display space, facilitates the user to view, and can display more mails, thereby further improving the viewing experience of the user.

On the basis of the above technical solutions, a process that a mail display window is created in step S120 may include: creating, by the instant messaging IM client, the mail display window.

Correspondingly, a process that mail information of the target mail is displayed in the mail display window in step S120 may include: acquiring, by the IM client, mail content information based on the mail sharing information, and displaying the mail content information in the mail display window.

In this way, the user may directly view detailed content of the mail through the IM client without jumping to the mail client.

Further, displaying mail information of the target mail in the mail display window may include: displaying the mail display window in a preset area of the IM client, and displaying the mail content information in the mail display window.

For example, the mail display window may be embedded in the IM client, so that once receiving the mail viewing operation triggered by the user for the mail sharing information, the mail content information may be presented in the mail display window embedded in the IM client.

On the basis of the above technical solutions, the mail information of the target mail or the detailed information of the target mail displayed in the mail display window may include: an attachment download link, sender and receiver information, subject information, and text information. Correspondingly, the method may further include: in response to detecting an attachment download operation triggered by the user for the attachment download link, generating an attachment download request based on user information of the user; and sending the attachment download request to a mail server, in order that the mail server performs identity authentication based on the user information in the attachment download request, and allows the attachment download operation when the user information meets a preset download condition.

The sender and receiver information may include receiver information of the target mail and/or sender information of the target mail. It should be noted that, the sharee of the target mail may be the receiver or the sender of the target mail, or other users other than the receiver and the sender. The attachment download link may refer to a link for downloading an attachment in the target mail. The preset download condition may be a preset condition to be met by the user who is allowed to download. For example, the preset download condition may be set to allow the sharer and all the sharees to download the attachment, or to allow a specified part of the sharees to download the attachment. The user information may include, but not limited to, identity information of the user. The identity information of the user may include, but not limited to, an IM account or a mailbox account of the user.

Specifically, if the user wants to download the attachment in the target mail, the attachment download operation may be triggered by clicking on a displayed mail download link. Once the attachment download operation triggered by the user is detected, the IM client may generate the attachment download request based on the user information, and send the attachment download request to the mail server. The mail server may detect whether the preset download condition is met based on the user information in the attachment download request. For example, the user information is matched with preset user information for which the download is allowed. If the match is successful, it means that the preset download condition is met, and the user has a permission to download. That is, the identity authentication is successful, and the attachment download operation may be allowed at this time. Therefore, the user may successfully download the attachment in the target mail. The security of the attachment can be guaranteed by performing identity authentication in the download of the attachment in the target mail.

On the basis of the above technical solutions, the method may further include: in response to detecting a mail jump operation triggered by the user for target mail link information in the mail information, jumping to the mail client of the user, and displaying mail content of the target mail on an interface of the mail client.

The mail information of the target mail or the detailed information of the target mail displayed in the mail display window may further include the target mail link information. The target mail link information may be link information for linking to a storage location of the target mail in the mail client, so as to jump to the target mail.

Specifically, the mail client of the sharer may share the target mail to the mail client corresponding to the sharee based on sharee mailbox information, so that the shared target mail may also be acquired in the mail client corresponding to the sharee, to be displayed in the mail client. The user may trigger the mail jump operation by clicking on the target mail link information displayed in the mail display window. For example, in response to detecting the mail jump operation triggered by the sharer for a target mail address, the IM client of the sharer may automatically jump to the mail client of the sharer based on the target mail link information, and the mail content of the target mail is displayed on the interface of the mail client, so that the sharer may view the target mail in the mail client. For another example, in response to detecting the mail jump operation triggered by the sharee for the target mail address, the IM client of the sharee may automatically jump to the mail client of the sharee based on the target mail link information, and the mail content of the target mail is displayed on the interface of the mail client, so that the sharee may view the target mail in the mail client. Therefore, the automatic jumping to the target mail is realized, and the diversity of the mail viewing modes is improved, and the personalized needs of the user are further satisfied.

Second Embodiment

Figure 6:
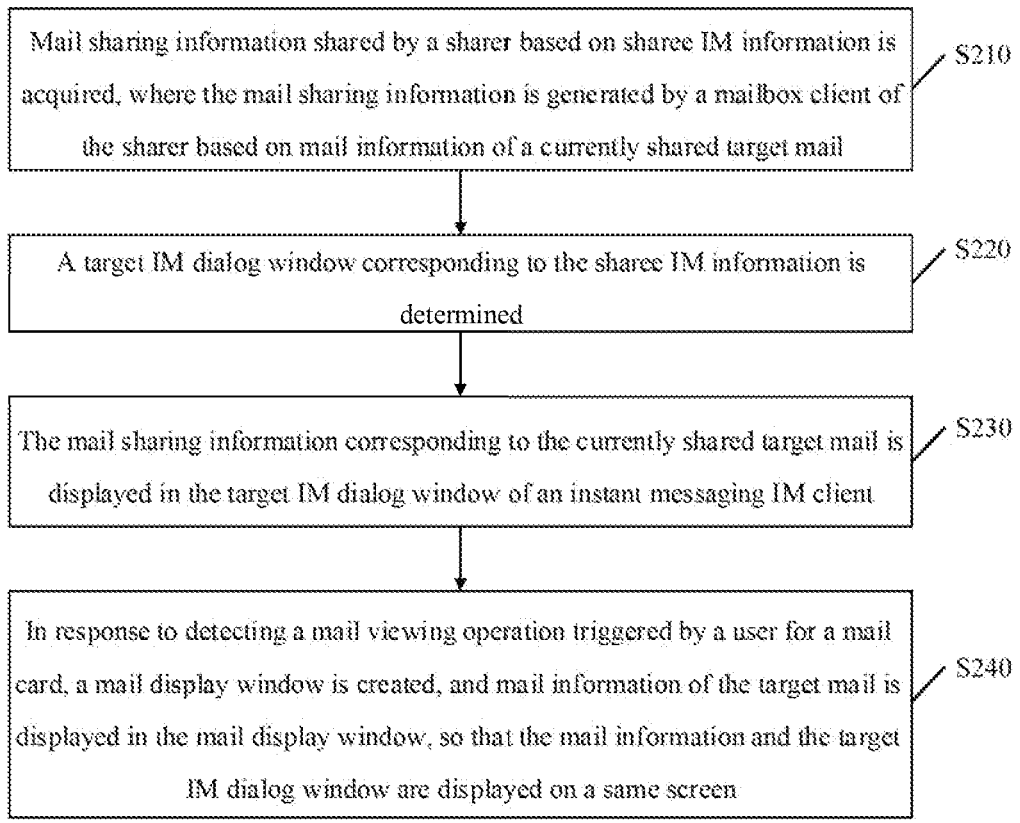
FIG. 6 is a schematic flowchart of a method for displaying mail information according to a second embodiment of the present disclosure.

FIG. 6 is a schematic flowchart of a method for displaying mail information according to a second embodiment of the present disclosure. This embodiment may be combined with the above embodiment, and the acquisition method of the mail sharing information and the determination method of the target IM dialog window are described. The explanations of the terms that are the same as or corresponding to those in the above embodiment are not repeated here.

Referring to FIG. 6, the method for displaying the information according to the embodiment specifically includes the following steps S210 to S240.

In step S210, mail sharing information shared by a sharer based on sharee IM information is acquired, where the mail sharing information is generated by a mail client of the sharer based on mail information of a currently shared target mail.

The sharee IM information may include information of one or more IM users and/or information of one or more IM user groups. The IM user may refer to any friend in the IM client of the sharer. The IM user group may refer to any group that has been created in the IM client of the sharer, so that each user in the IM user group may communicate in a dialog interface of the group. The IM user group may be created and obtained based on at least three IM users. IM user information may include, but not limited to, an IM user name. The IM user group information may include, but is not limited to, an IM user group name.

Specifically, if the sharer is to share the target mail, the sharer may trigger a mail sharing operation based on a preset sharing button on a mail display interface of the target mail. For example, the mail sharing operation is triggered by clicking the preset sharing button on the mail display interface of the target mail. When the mail client of the sharer detects the mail sharing operation, the mail client may acquire sharee IM information input or selected by the sharer, and generate mail sharing information based on mail information of the target mail. Thus, the mail sharing information may be shared to the IM client of the sharee corresponding to the sharee IM information based on the sharee IM information. Therefore, the IM client of the sharer may acquire the mail sharing information, and correspondingly, the IM client of the sharee may also acquire the same mail sharing information.

For example, if the sharee IM information includes information of one or more IM users, the mail sharing information corresponding to the target mail may be sent to the IM client of each IM user based on the IM user information. When the sharee IM information includes information of one or more IM user groups, the mail sharing information corresponding to the target mail may be sent to the IM client where the user group is created based on information of each IM group user, so that the mail sharing information may be displayed on the IM client of each user in the user group.

For example, the mail sharing information is generated based on the mail information of the currently shared target mail by: if the target mail is a new mail in an editing state, generating mail sharing information for collaborative editing based on mail information of the new mail; and if the target mail is an existing mail in a mailbox, generating mail sharing information for mail viewing based on mail information of the existing mail.

The new mail in the editing state may refer to a new editable mail created by the sharer by triggering the compose of the mail. The existing mail in the mailbox may be, but is not limited to, a received mail in an inbox, a sent mail in an outbox, or an edited mail stored in a draft box.

Figure 7:
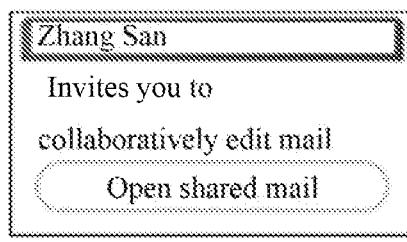
FIG. 7 is a display example of mail sharing information for collaborative editing according to the second embodiment of the present disclosure.

Specifically, if the currently shared target mail is the new mail in the editing state, it means that the sharer and the sharee may edit the target mail collaboratively. At this time, based on a first preset display mode, information integration may be performed on the mail information of the new mail to generate the mail sharing information for collaborative editing, so that the mail information of the new mail is displayed in the first preset display mode in the mail sharing information. For example, FIG. 7 shows a display example of mail sharing information for collaborative editing. The mail sharing information in FIG. 7 may indicate that a sharee and a sharer needs to edit a mail together.

Figure 8:
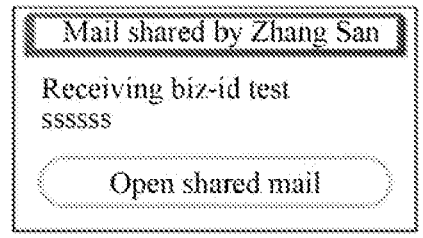
FIG. 8 is a display example of mail sharing information for mail viewing according to the second embodiment of the present disclosure.

If the currently shared target mail is the existing mail in the mailbox, based on a second preset display mode, information integration may be performed on the mail information of the existing mail to generate the mail sharing information for mail viewing, so that the mail information of the existing mail is displayed in the second preset display mode in the mail sharing information. For example, FIG. 8 shows a display example of mail sharing information for mail viewing. The mail sharing information in FIG. 8 may prompt a sharee that a shared mail is currently received.

For example, card display content of the mail sharing information may include, but is not limited to, at least one of sharer information, subject information, and text summary information, to briefly present mail content of the shared mail received by the sharee. As shown in FIG. 8, the card content of the mail sharing information may include sharer information (Zhang San), subject information (receiving biz-id test), and text summary information (sssss) in text information.

In step S220, a target LM dialog window corresponding to the sharee IM information determined.

Specifically, different sharee IM information corresponds to different target IM dialog windows, so that the mail sharing information corresponding to the shared mail may be sent to a specified target IM dialog window for display, which further satisfies the personalized needs of the user.

For example, S220 may include: if the sharee IM information includes IM user information, determining an IM user dialog window corresponding to the IM user information as the target dialog window; and if the sharee IM information includes IM user group information, determining an IM group dialog window corresponding to the IM user group information as the target dialog window.

The IM user dialog window may refer to a dialog window including two IM users, and may also be referred to as the IM user dialog window. For example, the IM user dialog window may support a dialog communication between the sharer and one sharee. The IM group dialog window may refer to a dialog window corresponding to a pre-created IM user group, to support communication among all IM users in the IM user group. For example, the IM group dialog window may support a communication between the sharer and at least two sharees.

Figure 9:
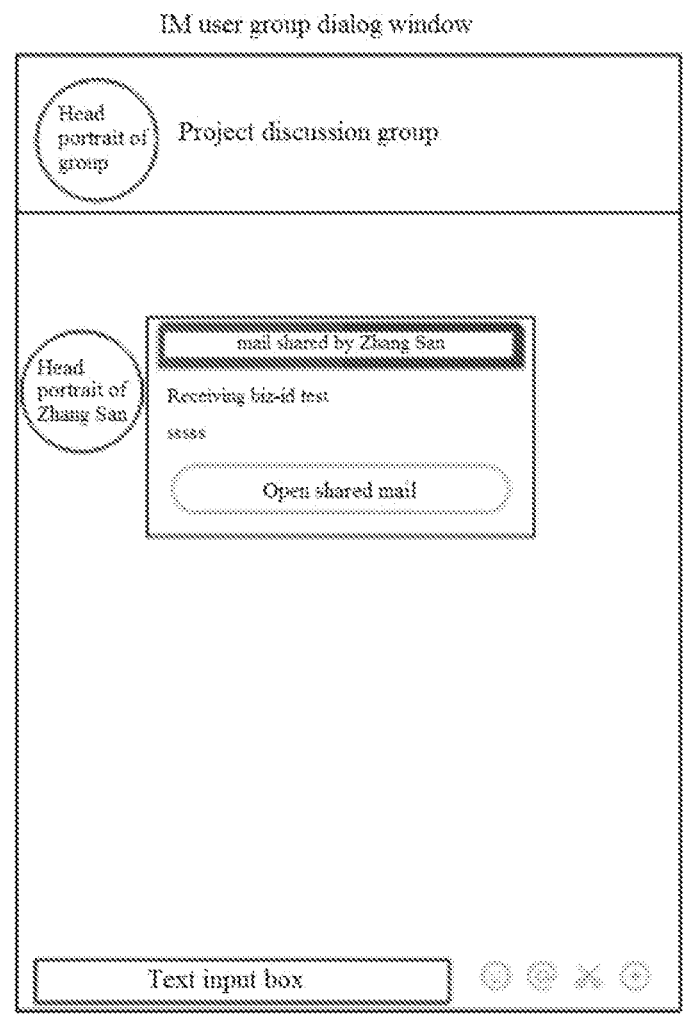
FIG. 9 is a display example of an IM group dialog window according to the second embodiment of the present disclosure.

Specifically, in a case that the sharee IM information includes the IM user information, for example, the sharee IM information is an IM user, and the IM user name is "Li Si", a dialog window including Li Si and Zhang San (assuming Zhang San is the sharer) in an IM client of Li Si may be determined as the target dialog window, so that the mail sharing information is displayed in the dialog window between Li Si and Zhang San. In a case that the sharee IM information includes the IM user group information, for example, the sharee information is an IM user group, and a group name of the IM user group is "project discussion group", as shown in FIG. 9, a group dialog window corresponding to the name "project discussion group" in the IM client may be determined as the target dialog window, so that the mail sharing information is displayed in the IM group dialog window.

In step S230, the mail sharing information corresponding to the currently shared target mail is displayed in the target IM dialog window of an instant messaging IM client.

In step S240, in response to detecting a mail viewing operation triggered by a user for the mail sharing information, a mail display window is created, and mail information of the target mail is displayed in the mail display window, so that the mail information and the target IM dialog window are displayed on a same screen.

For example, in a case that the mail sharing information is mail sharing information for collaborative editing, S240 may include: in response to detecting a mail viewing operation triggered by the user on the mail sharing information for collaborative editing, creating the mail display window, and displaying a mail editing page for the target mail in the mail display window, where the mail editing page may be used by the user to collaboratively edit the target mail. The mail editing page and the target IM dialog window are displayed on the same screen, in order that the user performs collaborative editing in the mail editing page.

Specifically, when sharing the target mail, the sharer may set a mail processing permission for each sharee. For example, the mail processing permission may include, but is not limited to, at least one of a mail editing permission, a mail viewing permission, a mail sending permission, and a re-sharing permission. The mail editing permission may include editing permission for each part in the mail. Each sharee may determine display content of the mail editing page based on the mail processing permission granted by the sharer. The display content of the mail editing page may be at least a part of the target mail determined based on the mail processing permission, so that different sharees may have editing permissions on different locations. Therefore, the sharer and the sharee may collaboratively edit content of the target mail in the mail editing page based on their own editing permission, which further satisfies the personalized needs of the user and improves the user experience.

It should be noted that, in response to detecting a mail sending operation triggered for the edited target mail by the sharer or the sharee with the mail sending permission, an updated target mail may be sent to a mail client corresponding to receiver mailbox information based on the receiver mailbox information in the updated target mail.

In the technical solution according to the embodiments of the present disclosure, mail sharing information shared by a mail client of a sharer based on sharee IM information is acquired, and a target IM dialog window is determined based on the sharee IM information. Therefore, the mail sharing information corresponding to the shared mail may be sent to a specified target IM dialog window for display, thereby further satisfying the personalized needs of the user.

The following is an embodiment of an apparatus for displaying mail information according to an embodiment of the present disclosure. The apparatus and the method for displaying the mail information according to the above embodiments belong to a same inventive concept. For details that are not described in detail in the embodiment of the apparatus for displaying the mail information, reference may be made to the above embodiments of the method for displaying the mail information.

Third Embodiment

Figure 10:
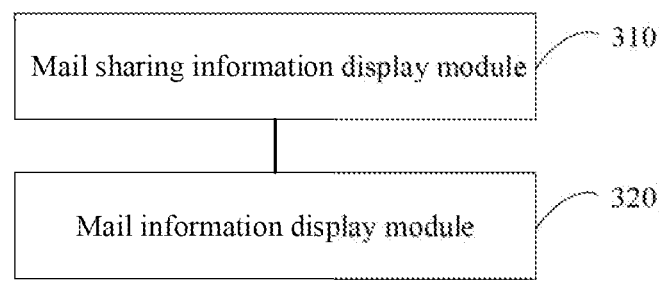
FIG. 10 is a schematic structural diagram of an apparatus for displaying mail information according to a third embodiment of the present disclosure.

FIG. 10 is a schematic structural diagram of an apparatus for displaying mail information according to a third embodiment of the present disclosure. This embodiment is applicable to a case where mail information of a shared mail is displayed in an IM client. The apparatus specifically includes a mail sharing information display module 310 and a mail information display module 320.

The mail sharing information display module 310 is configured to display mail sharing information corresponding to a shared target mail in a target IM dialog window of an instant messaging IM client. The mail information display module 320 is configured to: in response to detecting a mail viewing operation triggered by a user for the mail sharing information, create a mail display window, and display mail information of the target mail in the mail display window, in order that the mail information and the target IM dialog window are displayed on a same screen, i.e., the mail display window and the target IM dialog window are displayed on the same screen.

In the technical solution according to the embodiments of the present disclosure, in response to detecting a mail viewing operation triggered by a user for mail sharing information displayed in a target IM dialog window, a mail display window is created, and mail information of a target mail is displayed in the mail display window, so that the mail information and the target IM dialog window are displayed on a same screen. Therefore, the mail display window and the target IM dialog window may be displayed on a same screen interface, so that the user may view the mail information and dialog information at the same time, which improves the information viewing efficiency and the user experience.

On the basis of the above technical solution, the apparatus further includes a mail sharing information acquisition module and a target IM dialog window determination module.

The mail sharing information acquisition module is configured to: before displaying the mail sharing information corresponding to the shared mail in the target IM dialog window of the instant messaging IM client, acquire the mail sharing information shared by a mail client of a sharer based on sharee IM information, where the mail sharing information is generated by the mail client of the sharer based on the mail information of the shared target mail.

The target IM dialog window determination module is configured to determine the target IM dialog window corresponding to the sharee IM information.

On the basis of the above technical solutions, the target IM dialog window determination module is specifically configured to:

in response to the sharee IM information including IM user information, determine an IM user dialog window corresponding to the IM user information as the target dialog window; and in response to the sharee IM information including IM user group information, determine an IM group dialog window corresponding to the IM user group information as the target dialog window.

On the basis of the above technical solutions, the mail client of the sharer includes a mail sharing information generation module which is configured to:

in response to the target mail being a new mail in an editing state, generate mail sharing information for collaborative editing based on mail information of the new mail; and in response to the target mail being an existing mail in a mailbox, generate mail sharing information for mail viewing based on mail information of the existing mail.

On the basis of the above technical solutions, the mail information display module 320 is specifically configured to:

in response to detecting a mail viewing operation triggered by the user on the mail sharing information for collaborative editing, create the mail display window, and display a mail editing page of the target mail in the mail display window, so that the mail editing page and the target IM dialog window are displayed on the same screen, and the user is allowed to perform collaborative editing in the mail editing page, i.e., the mail editing page is used by the user for performing collaborative editing in the mail editing page.

On the basis of the above technical solutions, the mail information display module 320 includes a unit for creating mail display window. The unit for creating mail display window is configured to create the mail display window that is displayed side by side with the target IM dialog window.

On the basis of the above technical solutions, the mail display window creation unit is further configured to:

create a movable mail display window, in order that the mail display window is moved based on a window movement operation triggered by the user.

On the basis of the above technical solutions, the mail information display module 320 includes a mail information display unit which is configured to:

display brief information of all shared target mails in a list in the mail display window; and in response to detecting a detail viewing operation triggered for a cell where the brief information is located, display detailed information of the corresponding target mail.

On the basis of the above technical solutions, the mail information of the target mail includes an attachment download link; and the apparatus further includes an attachment download request generation module and an attachment download request sending module.

The attachment download request generation module is configured to: in response to detecting an attachment download operation triggered by the user for the attachment download link, generate an attachment download request based on user information of the user.

The attachment download request sending module is configured to send the attachment download request to a mail server, in order that the mail server performs identity authentication based on the user information in the attachment download request, and allows the attachment download operation when the user information meets a preset download condition.

On the basis of the above technical solutions, the apparatus further includes a mail jump module.

The mail jump module is configured to: in response to detecting a mail jump operation triggered by the user for target mail link information in the mail information, jump to the mail client of the user, and display mail content of the target mail on an interface of the mail client.

On the basis of the above technical solutions, the mail information display module 320 is specifically configured to: create, through the instant messaging IM client, the mail display window; and acquire, by the IM client, mail content information based on the mail sharing information, and display the mail content information in the mail display window.

On the basis of the above technical solutions, the mail information display module 320 is specifically configured to: display the mail display window in a preset area of the IM client, and display the mail content information in the mail display window.

The apparatus for displaying the mail information according to the embodiment of the present disclosure may execute the method for displaying the mail information according to any embodiment of the present disclosure, and has corresponding functional modules and beneficial effects for executing the method for displaying the mail information.

It should be noted that the division of the units and the modules in the above apparatus is merely based on logical functions, and is limited to the above description, as long as the corresponding functions can be realized. In addition, the terms used for identifying the functional units are only to distinguish among the different units, and are not intended to limit the scope of protection of the embodiments of the present disclosure.

Fourth Embodiment

Figure 11:
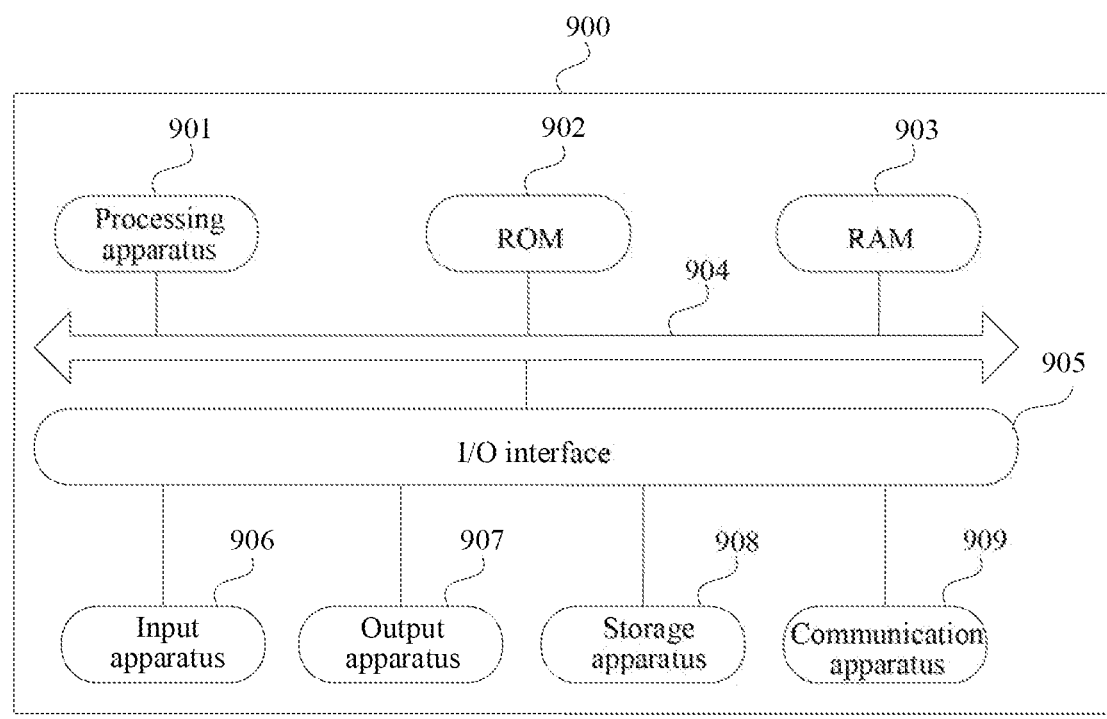
FIG. 11 is a schematic structural diagram of an electronic device according to a fourth embodiment of the present disclosure.

Reference is made to FIG. 11, which is a schematic structural diagram of an electronic device (e.g., a terminal device or a server in FIG. 11) 900 suitable for implementing the embodiments of the present disclosure. The terminal device according to the embodiments of the present disclosure may include, but is not limited to, mobile phones, laptops, digital broadcast receivers, PDAs (personal digital assistants), PADs (tablets), PMPs (portable multimedia players), vehicle-mounted terminals (such as in-vehicle navigation terminals) and other mobile terminals and fixed terminals such as digital TVs and desktop computers. The electronic device shown in FIG. 11 is only exemplary, and should not indicate any limitation to the function and scope of application of the embodiments of the present disclosure.

As shown in FIG. 11, the electronic device 900 may include a processing apparatus (e.g., a central processing unit or a graphics processor) 901, which may execute various operations and processing based on a program stored in a read only memory (ROM) 902 or a program loaded from a storage apparatus 908 into a random access memory (RAM) 903. The RAM 903 is further configured to store various programs and data required by the electronic device 900 to perform an operation. The processing apparatus 901, the ROM 902 and the RAM 903 are connected to each other through a bus 904. An input/output (I/O) interface 905 is also connected to the bus 904.

Generally, the I/O interface 905 may be connected to: an input apparatus 906, such as a touch screen, a touch panel, a keyboard, a mouse, a camera, a microphone, an accelerometer, and a gyroscope; an output apparatus 907, such as a liquid crystal display (LCD), a speaker, and a vibrator, a storage apparatus 908 such as a magnetic tape and a hard disk; and a communication apparatus 909. The communication apparatus 909 enables wireless or wired communication between the electronic device 900 and other devices for data exchanging. Although FIG. 11 shows an electronic device 900 having various components, it should be understood that the illustrated components are not necessarily required to all be implemented or included. Alternatively, more or fewer components may be implemented or included.

Particularly, according to the embodiments of the present disclosure, the processes described above with reference to the flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 909, or installed from the storage apparatus 908, or installed from the ROM 902. When the computer program is executed by the processing apparatus 901, the functions defined in the method according to the embodiment of the present disclosure are performed.

The electronic device according to the embodiment of the present disclosure and the method for displaying the mail information according to the above embodiments belong to a same inventive concept. For technical details not described in detail in the embodiment of the present disclosure, reference may be made to the above embodiments, and the embodiment of the present disclosure has the same beneficial effects as the above embodiments.

Fifth Embodiment

According to an embodiment of the present disclosure, a computer storage medium having stored thereon a computer program is provided. The program is executed by a processor to implement the method for displaying the mail information according to the above embodiments.

It is to be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes included in the computer readable medium may be transmitted via any proper medium including but not limited to: a wire, an optical cable, radio frequency (RF) and the like, or any proper combination thereof.

In some embodiments, the client and the server may communicate using any currently known or future developed network protocol such as HyperText Transfer Protocol (HTTP), and may be interconnected with any form or medium of digital data communication (e.g., a communication network). Examples of the communication network include a local area network ("LAN"), a wide area network ("WAN"), the internet (e.g., the Internet), and an end-to-end network (e.g., ad hoc end-to-end network) or any of a currently known or a future developed network.

The computer readable medium may be incorporated in the electronic device, or may exist alone without being assembled into the electronic device.

The computer readable medium carries one or more programs. The one or more programs, when executed by the electronic device, cause the electronic device to:

display mail sharing information corresponding to a shared target mail in a target IM dialog window of an instant messaging IM client; and in response to detecting a mail viewing operation triggered by a user for the mail sharing information, create a mail display window, and display mail information of the target mail in the mail display window, where the mail display window and the target IM dialog window are displayed on a same screen.

The computer program code for performing the operations disclosed in the present disclosure may be written in one or more programming languages or combinations thereof. The programming languages include but are not limited to an object-oriented programming language, such as Java, Smalltalk, and C++, and a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block diagrams in the drawings illustrate the architecture, functions and operations that can be implemented by the system, method and computer program product according to the embodiments of the present disclosure. Each block in a flow chart or a block diagram may represent a module, a program segment, or a part of code, and part of the module, program segment, or part of code includes one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or actions, or may be realized by a combination of dedicated hardware and computer instructions.

The units mentioned in the description of the embodiments of the present disclosure may be implemented by means of software, or otherwise by means of hardware. The name of the unit does not constitute a limitation on the unit itself under certain circumstances. For example, an editable content display unit may also be described as an "editing unit".

The functions described herein above may be performed at least in part by one or more hardware logic components. For example, without limitation, exemplary types of hardware logic components that can be used include: Field Programmable Gate Array (FPGA), Application Specific Integrated Circuit (ASIC). Application Specific Standard Product (ASSP), System on Chip (SOC), Complex Programmable Logical device (CPLD) and the like.

In the present disclosure, a machine readable medium may be a tangible medium, which may contain or store a program used by the instruction execution system, apparatus, or device or a program used in combination with the instruction execution system, apparatus, or device. The machine readable medium may be a machine readable signal medium or a machine readable storage medium. The machine readable medium may include, but is not limited to, a system, an apparatus or a device in an electronic, magnetic, optical, electromagnetic, infrared, or semi-conductive form, or any suitable combination thereof. The machine readable storage medium, for example, includes an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

According to one or more embodiments of the present disclosure, a method for displaying mail information is provided in a first example. The method includes:

displaying mail sharing information corresponding to a shared target mail in a target IM dialog window of an instant messaging IM client; and in response to detecting a mail viewing operation triggered by a user for the mail sharing information, creating a mail display window, and displaying mail information of the target mail in the mail display window, so that the mail display window and the target IM dialog window are displayed on a same screen.

According to one or more embodiments of the present disclosure, the method for displaying the mail information is provided in a second example. The method further includes:

before displaying the mail sharing information corresponding to the shared mail in the target IM dialog window of the instant messaging IM client, the method further includes:

acquiring the mail sharing information shared by a mail client of a sharer based on sharee IM information, where the mail sharing information is generated by the mail client of the sharer based on the mail information of the shared target mail; and determining the target IM dialog window corresponding to the sharee IM information.

According to one or more embodiments of the present disclosure, the method for displaying the mail information is provided in a third example. The method further includes:

the determining the target IM dialog window corresponding to the sharee IM information includes:

in response to the sharee IM information including IM user information, determining an IM user dialog window corresponding to the IM user information as the target dialog window; and in response to the sharee IM information including IM user group information, determining an IM group dialog window corresponding to the IM user group information as the target dialog window.

According to one or more embodiments of the present disclosure, the method for displaying the mail information is provided in a fourth example. The method further includes:

the mail sharing information is generated based on the mail information of the currently shared target mail by:

in response to the target mail being a new mail in an editing state, generating mail sharing information for collaborative editing based on mail information of the new mail; and in response to the target mail being an existing mail in a mailbox, generating mail sharing information for mail viewing based on mail information of the existing mail.

According to one or more embodiments of the present disclosure, the method for displaying the mail information is provided in a fifth example. The method further includes:

the in response to detecting a mail viewing operation triggered by a user for the mail sharing information, creating a mail display window, and displaying mail information of the target mail in the mail display window includes:

in response to detecting a mail viewing operation triggered by the user for mail sharing information for collaborative editing, creating the mail display window, and displaying a mail editing page of the target mail in the mail display window, where the user performs collaborative editing in the mail editing page.

According to one or more embodiments of the present disclosure, the method for displaying the mail information is provided in a sixth example. The method further includes:

the creating a mail display window includes:

creating the mail display window that is displayed side by side with the target IM dialog window.

According to one or more embodiments of the present disclosure, the method for displaying the mail information is provided in a seventh example. The method further includes:

the creating a mail display window includes:

creating a movable mail display window, so that the mail display window is moved based on a window movement operation triggered by the user.

According to one or more embodiments of the present disclosure, the method for displaying the mail information is provided in an eighth example. The method includes:

the displaying mail information of the target mail in the mail display window includes:

displaying brief information of all shared target mails in a list in the mail display window; and in response to detecting a detail viewing operation triggered for a cell where the brief information is located, displaying detailed information of the target mail.

According to one or more embodiments of the present disclosure, the method for displaying the mail information is provided in a ninth example. The method further includes:

the mail information of the target mail includes an attachment download link; and the method further includes:

in response to detecting an attachment download operation triggered by the user for the attachment download link, generating an attachment download request based on user information of the user; and sending the attachment download request to a mail server, where the attachment download request is configured to download an attachment after the user passed the identity authentication performed by the mail server based on the user information.

According to one or more embodiments of the present disclosure, the method for displaying the mail information is provided in a tenth example. The method further includes:

the method further includes:

in response to detecting a mail jump operation triggered by the user for target mail link information in the mail information, jumping to the mail client of the user, and displaying mail content of the target mail on an interface of the mail client.

According to one or more embodiments of the present disclosure, the method for displaying the mail information is provided in an eleventh example. The method further includes:

the creating a mail display window includes:

creating, by the IM client, the mail display window; and the displaying mail information of the target mail in the mail display window includes:

acquiring mail content information based on the mail sharing information, and displaying the mail content information in the mail display window.

According to one or more embodiments of the present disclosure, the method for displaying the mail information is provided in a twelfth example. The method further includes:

the displaying mail information of the target mail in the mail display window includes:

displaying the mail display window in a preset area of the IM client, and displaying the mail content information in the mail display window.

According to one or more embodiments of the present disclosure, an apparatus for displaying mail information is provided in a thirteenth example. The apparatus includes a mail sharing information display module and a mail information display module.

The mail sharing information display module is configured to display mail sharing information corresponding to a shared target mail in a target IM dialog window of an instant messaging IM client.

The mail information display module is configured to: in response to detecting a mail viewing operation triggered by a user for the mail sharing information, create a mail display window, and display mail information of the target mail in the mail display window, where the mail display window and the target IM dialog window are displayed on a same screen.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, the scope of the present disclosure may cover a technical solution formed by replacing the features described above with technical features with similar functions disclosed in (but not limited to) the present disclosure.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for displaying mail information, implemented by a processor of an electronic device, comprising:

displaying mail sharing information corresponding to a currently shared target mail in a target instant messaging IM dialog window of an IM client;

detecting a mail viewing operation triggered by a user for the mail sharing information;

creating a mail display window in response to the mail viewing operation; and displaying mail information of the target mail in the mail display window, wherein the mail display window and the target IM dialog window are displayed on a same screen of the electronic device, wherein the method further comprises:

determining, based on a mail editing permission granted to a sharee of the target mail by a sharer of the target mail, at least a part of the target mail as display content in a mail editing page, wherein the mail editing permission comprises editing permission for part in the target mail, and different sharees have editing permissions on different locations of the target mail; and implementing collaborative edit of the sharer and the sharee on the display content in the mail editing page, wherein before displaying the mail sharing information corresponding to the shared mail in the target IM dialog window of the IM client, the method further comprises:

acquiring the mail sharing information shared by the sharer based on sharee IM information, wherein the mail sharing information is generated by a mail client of the sharer based on the mail information of the shared target mail; and determining the target IM dialog window corresponding to the sharee IM information, wherein generating the mail sharing information based on the mail information of the currently shared target mail comprises:

when the target mail is a new mail in an editing state, generating mail sharing information for collaborative editing based on mail information of the new mail; or when the target mail is an existing mail in a mailbox, generating mail sharing information for mail viewing based on mail information of the existing mail, and wherein the after detecting a mail viewing operation triggered by a user for the mail sharing information, creating a mail display window, and displaying mail information of the target mail in the mail display window comprises:

after detecting a mail viewing operation triggered by the user for the mail sharing information for collaborative editing, creating the mail display window, and displaying a mail editing page for the target mail in the mail display window, wherein the mail editing page is used by the user for performing collaborative editing in the mail editing page.

2. The method according to claim 1, wherein the determining the target IM dialog window corresponding to the sharee IM information comprises:

in response to the sharee IM information comprising IM user information, determining an IM user dialog window corresponding to the IM user information as the target dialog window; and in response to the sharee IM information comprising IM user group information, determining an IM group dialog window corresponding to the IM user group information as the target dialog window.

3. The method according to claim 1, wherein the creating a mail display window comprises:

creating the mail display window that is displayed side by side with the target IM dialog window.

4. The method according to claim 1, wherein the creating a mail display window comprises:

creating a movable mail display window, in order that the mail display window is moved based on a window movement operation triggered by the user.

5. The method according to claim 1, wherein the displaying mail information of the target mail in the mail display window comprises:

displaying brief information of all shared target mails in a list in the mail display window; and in response to detecting a detail viewing operation triggered for a cell where the brief information is located, displaying detailed information of a corresponding target mail.

6. The method according to claim 1, wherein the mail information of the target mail comprises an attachment download link; and the method further comprises:

in response to detecting an attachment download operation triggered by the user for the attachment download link, generating an attachment download request based on user information of the user; and sending the attachment download request to a mail server, wherein the attachment download request is used to download an attachment after the user passed the identity authentication performed by the mail server based on the user information.

7. The method according to claim 1, further comprising:

in response to detecting a mail jump operation triggered by the user for target mail link information in the mail information, jumping to a mail client of the user, and displaying mail content of the target mail on an interface of the mail client.

8. The method according to claim 1, wherein the creating a mail display window comprises:

creating, by the IM client, the mail display window; and the displaying mail information of the target mail in the mail display window comprises:

acquiring mail content information based on the mail sharing information, and displaying the mail content information in the mail display window.

9. The method according to claim 1, wherein the displaying mail information of the target mail in the mail display window comprises:

displaying the mail display window in a preset area of the IM client, and displaying mail content information in the mail display window.

10. An electronic device, comprising:

one or more processors; and a memory configured to store one or more programs, wherein the one or more programs, when executed by the one or more processors, cause the one or more processors to implement:

displaying mail sharing information corresponding to a currently shared target mail in a target instant messaging IM dialog window of an IM client;

detecting a mail viewing operation triggered by a user for the mail sharing information;

creating a mail display window in response to detecting the mail viewing operation; and displaying mail information of the target mail in the mail display window, wherein the mail display window and the target IM dialog window are displayed on a same screen of the electronic device, wherein the one or more processors is further caused to implement:

determining, based on a mail editing permission granted to a sharee of the target mail by a sharer of the target mail, at least a part of the target mail as display content in a mail editing page, wherein the mail editing permission comprises editing permission for part in the target mail, and different sharees have editing permissions on different locations of the target mail; and implementing collaborative edit of the sharer and the sharee on the display content in the mail editing page, wherein the one or more processors is further caused to implement:

acquiring the mail sharing information shared by the sharer based on sharee IM information, wherein the mail sharing information is generated by a mail client of the sharer based on the mail information of the shared target mail; and determining the target IM dialog window corresponding to the sharee IM information, wherein generating the mail sharing information based on the mail information of the currently shared target mail comprises:

when the target mail is a new mail in an editing state, generating mail sharing information for collaborative editing based on mail information of the new mail; or when the target mail is an existing mail in a mailbox, generating mail sharing information for mail viewing based on mail information of the existing mail, and wherein the one or more processors is further caused to implement:

after detecting a mail viewing operation triggered by the user for the mail sharing information for collaborative editing, creating the mail display window, and displaying a mail editing page for the target mail in the mail display window, wherein the mail editing page is used by the user for performing collaborative editing in the mail editing page.

11. The electronic device according to claim 10, wherein the one or more programs, when executed by the one or more processors, further cause the one or more processors to implement:

in response to the sharee IM information comprising IM user information, determining an IM user dialog window corresponding to the IM user information as the target dialog window; and in response to the sharee IM information comprising IM user group information, determining an IM group dialog window corresponding to the IM user group information as the target dialog window.

12. The electronic device according to claim 10, wherein the one or more programs, when executed by the one or more processors, further cause the one or more processors to implement:

creating the mail display window that is displayed side by side with the target IM dialog window.

13. The electronic device according to claim 10, wherein the one or more programs, when executed by the one or more processors, further cause the one or more processors to implement:

displaying brief information of all shared target mails in a list in the mail display window; and in response to detecting a detail viewing operation triggered for a cell where the brief information is located, displaying detailed information of a corresponding target mail.

14. A non-transitory computer readable storage medium storing a computer program thereon, wherein the program, when executed by a processor, causes the processor to implement:

displaying mail sharing information corresponding to a currently shared target mail in a target instant messaging IM dialog window of an IM client;

detecting a mail viewing operation triggered by a user for the mail sharing information;

creating a mail display window in response to detecting the mail viewing operation; and displaying mail information of the target mail in the mail display window, wherein the mail display window and the target IM dialog window are displayed on a same screen, wherein the program further causes the processor to implement:

determining, based on a mail editing permission granted to a sharee of the target mail by a sharer of the target mail, at least a part of the target mail as display content in a mail editing page, wherein the mail editing permission comprises editing permission for part in the target mail, and different sharees have editing permissions on different locations of the target mail; and implementing collaborative edit of the sharer and the sharee on the display content in the mail editing page, wherein before displaying the mail sharing information corresponding to the shared mail in the target IM dialog window of the IM client, the processor is further caused to implement:

acquiring the mail sharing information shared by the sharer based on sharee IM information, wherein the mail sharing information is generated by a mail client of the sharer based on the mail information of the shared target mail; and determining the target IM dialog window corresponding to the sharee IM information, wherein generating the mail sharing information based on the mail information of the currently shared target mail comprises:

when the target mail is a new mail in an editing state, generating mail sharing information for collaborative editing based on mail information of the new mail; or when the target mail is an existing mail in a mailbox, generating mail sharing information for mail viewing based on mail information of the existing mail, and wherein the after detecting a mail viewing operation triggered by a user for the mail sharing information, creating a mail display window, and displaying mail information of the target mail in the mail display window comprises:

after detecting a mail viewing operation triggered by the user for the mail sharing information for collaborative editing, creating the mail display window, and displaying a mail editing page for the target mail in the mail display window, wherein the mail editing page is used by the user for performing collaborative editing in the mail editing page.

* * * * *